United States Patent [19]
Doll et al.

[11] 3,994,507
[45] Nov. 30, 1976

[54] MOTORCYCLE COUPLING ASSEMBLY

[75] Inventors: Ronald Lloyd Doll, Santa Monica; Robert Arthur Peterson, West Los Angeles, both of Calif.

[73] Assignee: Spirit of America, Incorporated, Gardena, Calif.

[22] Filed: Feb. 27, 1975

[21] Appl. No.: 553,731

[52] U.S. Cl. .............................. 280/203; 403/141
[51] Int. Cl.² .................................... B62K 27/12
[58] Field of Search ................ 280/203, 511, 513; 403/141, 76, 122

[56] References Cited
UNITED STATES PATENTS

| | | | |
|---|---|---|---|
| 1,434,269 | 10/1922 | Underwood | 280/203 |
| 3,788,670 | 1/1974 | Petersen | 280/203 |

FOREIGN PATENTS OR APPLICATIONS

| | | | |
|---|---|---|---|
| 650,801 | 2/1929 | France | 280/203 |
| 657,849 | 3/1938 | Germany | 403/141 |
| 426,931 | 4/1935 | United Kingdom | 280/203 |

*Primary Examiner*—Kenneth H. Betts
*Attorney, Agent, or Firm*—Ellsworth R. Roston

[57] ABSTRACT

A coupling assembly adapted for releasably connecting a sidecar to a motorcycle includes a first coupling member attached to the motorcycle and having a ball-shaped portion with a first lateral dimension adjacent to second portions with a second lateral dimension greater than the first lateral dimension. A second coupling member is attached to the sidecar and has a bell-shaped configuration. Retaining means for engaging the ball-shaped portion of the first coupling member includes a plurality of fingers resiliently expandable to the second lateral dimension to receive the ball-shaped portion and contractable to the first lateral dimension to substantially enclose the ball-shaped portion. Screw means extending through the second coupling member draws the retaining means into the second coupling member. In this position the second coupling member prevents the expansion of the fingers from the first lateral dimension to the second lateral dimension thereby coupling the sidecar to the motorcycle.

13 Claims, 4 Drawing Figures

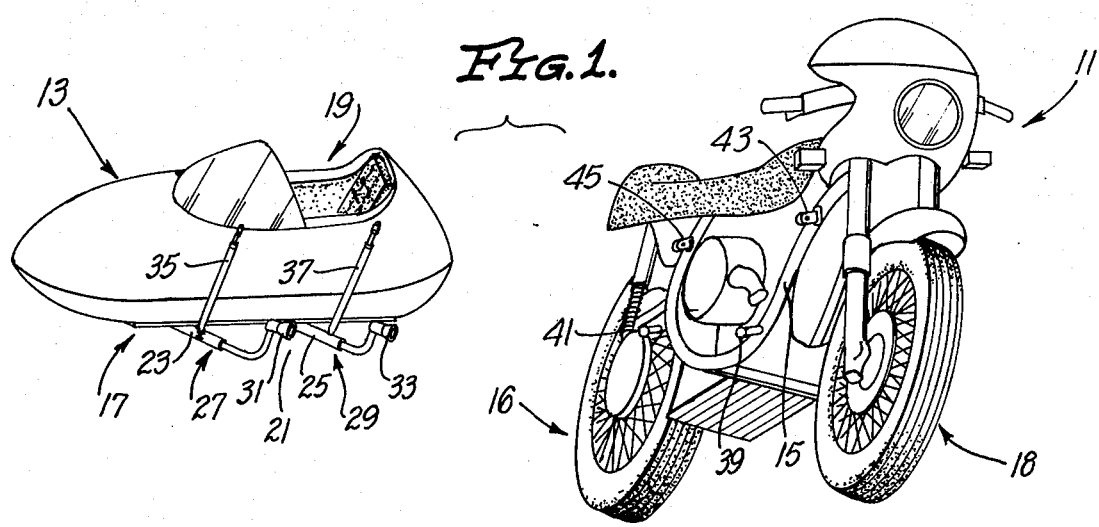
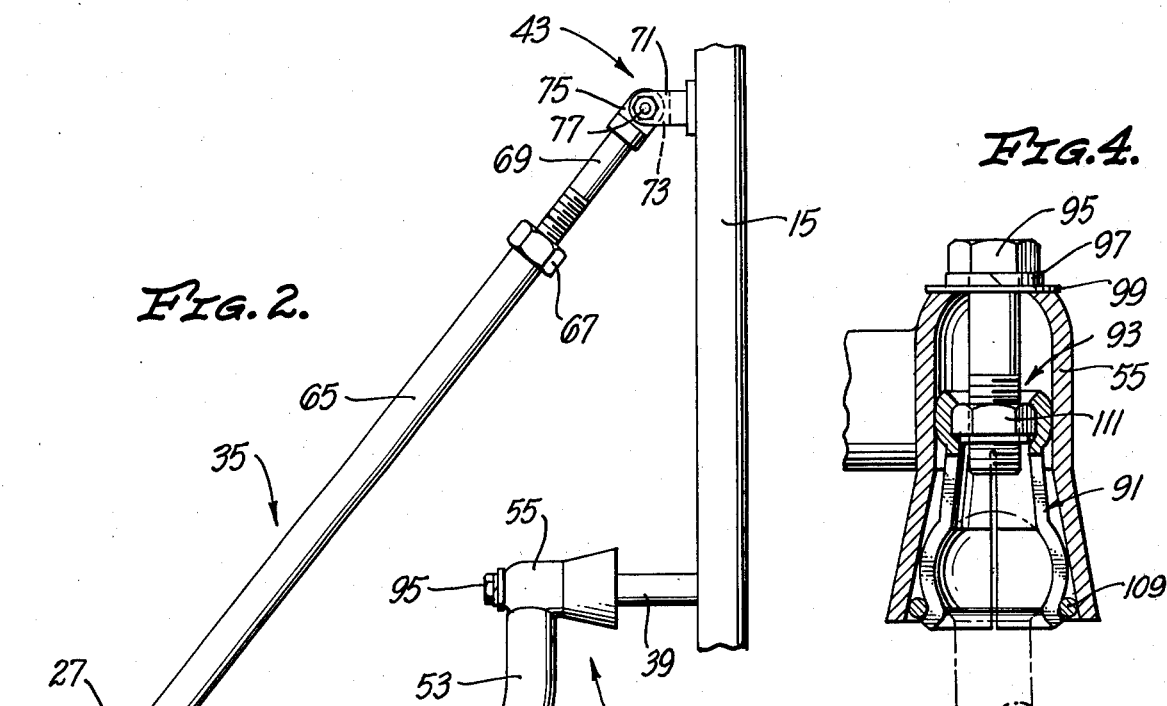
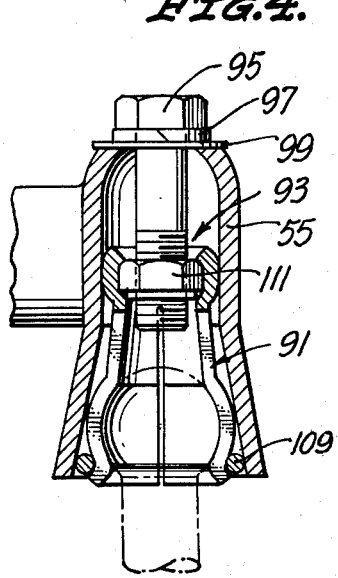
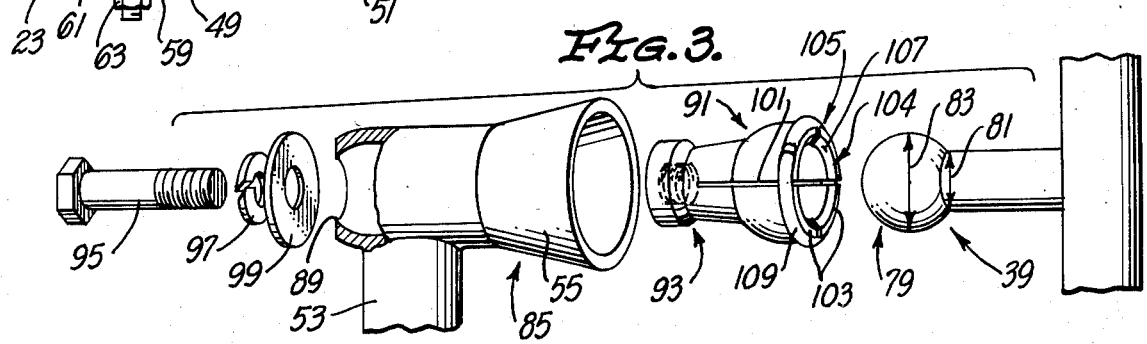

MOTORCYCLE COUPLING ASSEMBLY

BACKGROUND OF THE INVENTION

1. Field of the Invention

The present invention relates generally to coupling apparatus and more specifically to an assembly adapted for coupling a sidecar to a motorcycle.

2. Description of the Prior Art

Sidecars are often used in conjunction with motorcycles to provide additional passenger carrying capacity for the motorcycle. Typically these sidecars have been attached to the motorcycle by various linkage and bolts. Although it has been possible to detach the sidecar from the motorcycle by removing the bolts and associated linkage, this has not been a simple procedure. Furthermore, the reattachment of the sidecar to the motorcycle has involved a time consuming realignment procedure. As a consequence, the sidecars have tended to remain either attached to the motorcycle or detached from the motorcycle.

The attachment linkage has usually been custom designed to provide for the attachment of a particular sidecar to a particular motorcycle. The custom design of the linkage has significantly increased the expense of attaching the sidecar to the motorcycle.

SUMMARY OF THE INVENTION

In accordance with the present invention, a sidecar is provided with adjustable linkage members which are adaptable to couple a particular sidecar to substantially any motorcycle. Once the linkage members have been adjusted to align a particular sidecar and motorcycle combination, realignment is not necessary even after decoupling the sidecar. A special coupling assembly associated with the linkage members facilitates the coupling and decoupling of the sidecar and motorcycle.

The coupling assembly can include a ball-shaped portion permanently attached to the motorcycle and a bell-shaped portion permanently attached to the sidecar. A retainer having a plurality of fingers resiliently expandable to engage the ball-shaped portion can be drawn into the bell-shaped portion by a screw. The bell-shaped portion in proximity to the retainer inhibits the expansion of the fingers so that the ball-shaped portion is retained by the retainer. A bifurcated retainer ring disposed in a recess around the fingers provides means for transferring forces between the retainer and the bell-shaped portion. By means of the ring, radial forces produced on the retainer by a force tending to separate the ball-shaped portion and the retainer are transferred to the bell-shaped portion which prevents the separation. A few turns of the screw permits sufficient displacement of the retainer from the bell-shaped portion to permit disengagement of the ball-shaped portion from the retainer. Thus, the coupling assembly facilitates easy coupling and decoupling of the sidecar and motorcycle.

The sidecar has a main frame member and a first linkage member which telescopes with respect to the main frame member. The bell-shaped portion of the coupling assembly can be attached to the first linkage member for arcuate movement with respect to the sidecar. Thus the first linkage member is adjustable to position the bell-shaped portion of the coupling assembly for attachment to a lower attachment point on the frame of the motorcycle.

The main frame member can be bifurcated in proximity to the first linkage member to facilitate their relative pivotal movement. A second linkage member may be provided with a bolt at one end thereof to engage the bifurcated first main member and to inhibit the relative pivotal movement of the main frame member and the first linkage member. The second linkage member has a variable length facilitating its connection to an upper attachment point on the frame of the motorcycle. The variable relative positions of the first linkage member and the second linkage member with respect to the motorcycle permit attachment of the sidecar to substantially any motorcycle regardless of its frame configuration.

DESCRIPTION OF THE DRAWINGS

FIG. 1 is a front perspective view of a motorcycle and a sidecar of the present invention adapted for connection to the motorcycle;

FIG. 2 is a front plan view of a linkage and coupling assembly adapted for connection between the motorcycle and sidecar;

FIG. 3 is an assembled view of one embodiment of the coupling assembly illustrated in FIG. 2; and FIG. 4 is an axial cross-sectional view of a further embodiment of the coupling assembly illustrated in FIG. 2.

DESCRIPTION OF PREFERRED EMBODIMENTS

Illustrated in FIG. 1 are a motorcycle 11 and a sidecar 13 which is adapted for releasable connection to the motorcycle 11. The motorcycle 11 has a frame 15 which is supported in a generally vertical orientation along the length of the motorcycle 11 by a pair of wheels 16 and 18. The sidecar 13 has a frame 17 which is partially supported by a wheel 21 and which extends generally horizontally to support a body 19 defining a passenger compartment.

In a preferred embodiment, the frame 17 of the sidecar 13 includes a pair of main frame members 23 and 25 which extend laterally of the sidecar 13 to respective ends 27 and 29. A pair of linkage members can be connected to extend from each of the ends 27 and 29 of the main frame members 23 and 25, respectively. For example, a pair of first linkage members 31 and 33 and a pair of second linkage members 35 and 37 can be connected to the respective ends 27 and 29 of the respective main frame members 23 and 25. In a particular embodiment, these linkage members 31–37 might be referred to as secondary frame members.

In FIG. 1, the first linkage members 31 and 33 have free ends which are adapted for connection to the motorcycle 11 at a pair of lower connection points shown by the coupling members 39 and 41, respectively. Similarly, the second linkage members 35 and 37 have free ends which are adapted for connection to upper connection points shown by the coupling members 43 and 45.

Although the following discussion refers to the linkage associated with the main frame member 23, it will be understood that in a particular embodiment, the linkage associated with the main frame member 25 may have a similar construction.

As best illustrated in FIG. 2, the end 27 of the main frame member 23 can have a tubular configuration and can be axially bifurcated to receive the first linkage member 31. For example, the first linkage member 31 can be axially bifurcated to provide a first portion 47 and a second portion 49. In such an embodiment, the first linkage member 31 can include a first rod 51 which is adapted to fit in telescoping relationship with the main frame member 23. A second rod 53 can be attached in angular relationship to the first rod 51 at the outer end thereof. In the illustrated embodiment, the first rod 51 and the second rod 53 are formed from a single piece of tubing. This tubing can be bent to provide the desired angular relationship between the first and second rods 51 and 53 respectively. A second coupling member or sleeve 55 can be connected to the end of the second rod 53 for releasable connection to the lower coupling member 39 in a manner described in greater detail below.

Bifurcation of the main frame member 23 at the end 27 facilitates pivotal movement of the first linkage member 31 within the main frame member 23. This pivotal relationship makes it possible to pivot the sleeve 55 in an arc with respect to the sidecar 13. The telescoping relationship together with the pivotal relationship between the first linkage member 31 and the main frame member 23 makes it possible to move the sleeve 55 to an infinite number of positions on the surface of an imaginary cylinder. This facilitates adaptation of the coupling assembly to substantially any frame configuration associated with a particular motorcycle.

Once the linkage member 31 is adapted to a particular motorcycle 11, its movement with respect to the main frame member 23 can be inhibited by tightening the bifurcated portions 47 and 49 onto the first rod 51. This can be accomplished by attaching an eyelet 57 to the portion 47 and an eyelet 59 to the portion 49. A bolt 61 can be passed through the eyelets 57 and 59 and secured by a nut 63 to hold the portions 47 and 49 against the first rod 51. In a preferred embodiment, one end of the second linkage member 35 is attached to the bolt 61. Thus one of the linkage members, such as the member 35, provides means for securing the other of the linkage members, such as the member 31, to the main frame member 23. Of course, in a particular embodiment, the bolt 61 may be independent of the second linkage member 35. In such an embodiment, the second linkage members 35 and 37 may be independently attached to the frame 17 of the sidecar 13.

In a preferred embodiment, the second linkage member 35 includes a tubular member 65 attached to the bolt 61 and having at the opposite end thereof a nut 67. A rod member 69 of the second linkage member 35 is threaded at one end thereof for registration with the nut 67. A suitable coupling is provided for releasably attaching the opposite end of the rod member 69 to the frame 15 of the motorcycle 11.

In a preferred embodiment, this coupling for the second linkage member 35 includes a coupling member 43 which is bifurcated to define portions 71 and 73. An end portion 75 of the rod 69 can be disposed intermediate the portions 71 and 73 of the coupling member 43. A bolt can then be disposed through concentric holes in the portions 71, 73 and 75 to releasably attach the second linkage member 35 to the frame 15 of the motorcycle 11. The second linkage member 37 can be constructed similar to the second linkage member 35.

The coupling member 39 and sleeve 55 associated with the first member linkage 31 are shown generally in FIG. 2 and in greater detail in FIG. 3. In a preferred embodiment of this coupling assembly, the coupling member 39 is attached, for example by welding, to the frame 15 of the motorcycle 11. The coupling member 39 has a ball-shaped portion 79 which extends laterally of the motorcycle 11. The ball-shaped portion 79 can be more generally described as having a first lateral dimension (shown by the arrows 81) and a second lateral dimension (shown by the arrows 83) which is greater than the first lateral dimension.

The sleeve 55 is connected to the second rod 53, for example by welding. The sleeve 55 has a bell-shaped portion shown generally at 85 which faces laterally of the sidecar 13 toward the ball-shaped portion 79 extending laterally of the motorcycle 11. A hole 89 is provided at the end of the sleeve 55 opposite to the bell-shaped portions 85. A retainer 91, associated with the sleeve 55, has a threaded end 93. A screw 95 can be passed through a lock washer 97, a flat washer 99, and the hole 89 to engage the threaded end 93 of the retainer 91.

At the end of the retainer 91 opposite the threaded end 93, axial slots 101 define a plurality of fingers 103. The fingers 103 are normally biased to define an opening 104 having a diameter substantially equal to the first lateral dimension shown by the arrows 81 of the ball-shaped portion 79. However, the fingers 103 are expandable to a diameter equal to the second lateral dimension shown by the arrows 83. Thus the retainer 91 has properties for expanding to receive the ball-shaped portion 97 of the coupling member 39 within the fingers 103.

The ends of the fingers 103 define a collar shown generally at 105. The collar portion 105 defines an inner surface 107 which is slanted radially inwardly with progressive positions into the retainer 91. The surface 107 facilitates alignment of the ball-shaped portion 79 with the retainer 91 and sleeve 55 on the sidecar 13.

A further embodiment of the coupling assembly is illustrated in FIG. 4. In this embodiment, the retainer 91 includes a nut 111, which is snuggly enclosed by the walls of the retainer 91 at the end 93 thereof. The threads of the screw 95 are adapted to register with the threads of the nut 111 so that the coupling illustrated in FIG. 4 functions similarly to the coupling illustrated in FIG. 3.

A bifurcated ring 109 can be disposed around the fingers 103 adjacent to the collar 105. This ring 109 can be interposed between the retainer 91 and the bell-shaped portion 85 of the sleeve 55 to provide means for transferring forces between the retainer 91 and the sleeve 55. For example, as the retainer 91 is drawn into the sleeve 55 by the screw 95 the bell-shaped portions 85 exert a force through the ring 109 onto the fingers 103 of the retainer 91. This force is transferred onto the ball-shaped portion 79 of the coupling member 39 to provide a friction force which increases in magnitude with progressive positions of the retainer 91 into the sleeve 55.

The ring 109 also transfers forces from the retainer 91 to the sleeve 55. For example, when a force is exerted on the assembly tending to separate the coupling member 39 and the sleeve 55, the force is transferred to the fingers 103 by the ball-shaped portion 79. This force, which is directed radially outwardly, is in turn transferred by the ring 109 from the fingers 103 to the bell-shaped portion 85. The resistance of the bell-shaped portion 85 to outward expansion prevents the separation of the coupling member 39 and sleeve 55 as long as the sleeve 55 remains over the ring 109.

With either of the embodiments illustrated in FIGS. 3 and 4, the screw 95 can be tightened to draw the retainer 91 into the bell-shaped portion 85 of the sleeve 55. With the ball-shaped portion 79 disposed within the fingers 103 of the retainer 91, the drawing of the retainer 91 into the bell-shaped portion 85 will inhibit the outward expansion of the fingers 103. This, of course, will prevent the retraction of the ball-shaped portion 79 from the sleeve 55 since such a retraction would require an expansion of the fingers 103 to a larger diameter. On the other hand, a mere loosening of the screw 95 will permit the retainer 91 to separate from the sleeve 55 a distance sufficient to allow the retraction of the ball-shaped portion 79.

As previously mentioned, the linkage members 33 and 37 associated with the main frame member 25 may be similar to those described in reference to FIG. 2 to facilitate attachment to the respective coupling members 41 and 45 on the motorcycle 11. This coupling apparatus is of particular advantage since it facilitates the coupling and decoupling of the sidecar 13 and the motorcycle 11. All of the parts associated with the coupling assembly remain with the respective coupling members so that bolts and nuts are not easily lost. The alignment of the coupling member 39 and the sleeve 55 is particularly easy due to the slanted surface 107 on the collar 105 of the retainer 91. The adaptation of the sidecar 13 to a particular motorcycle frame configuration is enhanced by the adjustable linkage members 31–37.

Although the invention has been described with reference to particular embodiments, it will be appreciated by those skilled in the art that the invention can be otherwise embodied. For example, the bell-shaped coupling member 55 could be attached to the motorcycle 11 and the ball-shaped coupling member 39 could be attached to the rod 53 associated with the sidecar 13. Also, the linkage members 35 and 37 could be attached to the frame 17 of the sidecar 13 at points disassociated with the main frame members 23, 25 and the first linkage members 31, 33. For these reasons, the scope of the invention should be ascertained only with reference to the following claims.

We claim:
1. A coupling assembly for releasably connecting a sidecar and a motorcycle, comprising:
a coupling member having an elongated configuration and being constructed for connection to the sidecar, the coupling member having at one end thereof and configuration of a ball;
a retainer having a longitudinal axis and a threaded portion at one end thereof, the retainer having a plurality of fingers extending from the threaded portion to the other end of the retainer, the fingers being resiliently expandable outwardly of the longitudinal axis of the retainer to receive the ball of the coupling member and being resiliently contractible to grasp the ball;
a sleeve having a longitudinal axis and being constructed for connection to the motorcycle, the sleeve having at one end thereof bell-shaped portions extending radially outwardly with progressive positions along the longitudinal axis of the sleeve;
the retainer being constructed for progressive movement into the bell-shaped portions of the sleeve with the bell-shaped portions of the sleeve providing for the radial contraction of the fingers of the retainer on the ball with progressive movements of the retainer into the sleeve; and
threaded means extending through the sleeve from a position external to the sleeve for adjustably engaging the threads in the retainer and manually rotatable from the position external to the sleeve to move the retainer progressively into the sleeve, whereby
the sleeve inhibits expansion of the fingers of the retainer.

2. The coupling assembly recited in claim 1 wherein the retainer includes:
a collar portion disposed at the end of the retainer opposite the threaded portion, the collar portion having an inner surface slanted radially inwardly with progressive positions into the retainer to guide the ball of the coupling member into the retainer; and
a center portion interposed between the threaded portion and the collar portion and configured to receive the ball of the coupling member when the ball is guided into the retainer by the collar portion; and
the collar portion of the retainer defining with the center portion of the retainer a plurality of slots to provide the resilient fingers of the retainer.

3. The coupling assembly set forth in claim 2 wherein the collar portion of the retainer defines with the center portion of the retainer an annular recess and a bifurcated ring is disposed within the annular recess at the end opposite to the threaded portion of the retainer and contacts the bell-shaped portions of the sleeve and the fingers of the retainer to radially compress the fingers of the retainer with movement of the retainer into the sleeve.

4. The coupling assembly recited in claim 1 wherein the sleeve comprises shoulder portions disposed at the end of the sleeve opposite the ball-shaped portions and extending radially of the longitudinal axis to define an opening through which the screw means extends into the retainer.

5. A coupling assembly for releasably connecting a motorcycle and a sidecar, comprising:
a coupling member constructed for connection to one of the motorcycle and the sidecar and having a first portion with a first lateral dimension and a second portion adjacent to the first portion and with a second lateral dimension greater than the first lateral dimension and defining a portion to be positively gripped;
a retainer having resilient portions releasably engaging the second portion of the coupling member and constituting a plurality of fingers disposed in proximity to the second portion of the coupling member and expandable to a dimension greater than the second lateral dimension to receive the second portion of the coupling member and contractible to a dimension less than the first lateral dimension to provide a positive gripping of the second portion of the coupling member;
a sleeve shaped to receive the retainer progressively into the sleeve and to progressively contract the fingers of the retainer with progressive reception of the retainer into the sleeve; and
means extending through the sleeve from a position external to the sleeve and the retainer and adjustable to provide for the progressive reception of the retainer into the sleeve; and means disposed between the retainer and the sleeve for transferring forces between the retainer and the sleeve in accordance with adjustments of the last mentioned means.

6. The coupling assembly recited in claim 5 wherein the sleeve has a bell shape and the retainer has a configuration to facilitate the progressive reception of the retainer into the sleeve in accordance with the adjustable operation of the adjustable means supported by the sleeve.

7. The coupling assembly recited in claim 5 wherein said means between the retainer and sleeve is disposed in contiguous relationship with the fingers of the retainer for transferring the outward forces on the fingers to the sleeve.

8. The coupling apparatus set forth in claim 6 wherein the coupling member is connected to the sidecar and extends laterally of the sidecar and the sleeve is connected to the motorcycle and extends laterally of the motorcycle to receive the coupling member and wherein means are provided for rotating the sleeve relative to the sidecar.

9. The coupling apparatus set forth in claim 6 wherein the sidecar includes a primary frame member and a secondary frame member having a telescoping relationship and a pivotal relationship with the primary frame member and wherein one of the sleeve and the coupling member is attached to the secondary frame member for arcuate movement with respect to the sidecar.

10. A coupling assembly for coupling a motorcycle to a sidecar, comprising:
   a coupling member having a ball-shaped portion at one end thereof;
   a retainer constructed to receive the ball-shaped portion of the coupling member, the retainer having resilient properties for expanding in response to a force tending to separate the retainer and the coupling member and for contracting in the absence of such a force;
   a sleeve provided with an opening and constructed to receive the retainer through the opening and having a fixed circumference in proximity to the retainer and having a progressively decreasing circumference with progressive distances from the opening;
   means extending through the sleeve from a position external to the sleeve and adjustable to provide an adjustable disposition of the retainer in the sleeve and the retainer; and
   means disposed between the retainer and the sleeve for transferring forces between the retainer and the sleeve in accordance with the adjustments of the last mentioned means; whereby
   the fixed circumferential dimension of the sleeve inhibits the expansion of the retainer to prevent separation of the coupling member and the retainer.

11. The coupling assembly recited in claim 10 wherein the force transferring means includes:
   a bifurcated ring disposed around the retainer and having a circumferential dimension expandable in response to the expansion of the retainer; whereby the sleeve inhibits the expansion of the circumferential dimension of the ring to prevent the separation of the coupling member and the retainer.

12. The coupling assembly recited in claim 10 wherein the retainer has a threaded portion and the adjustable means includes:
   a screw extending through the sleeve and engaging the threaded portion of the retainer to draw the retainer into the sleeve, the sleeve being configured to exert a particular force through the force transferring means and the retainer onto the ball-shaped portion of the coupling member in accordance with the adjustments of the adjustable means, the particular force being directed radially inwardly and having a magnitude increasing with progressive positions of the retainer into the sleeve.

13. The coupling assembly recited in claim 12 wherein the retainer includes a nut snugly engaged by the walls of the retainer at the end of the retainer opposite the bifurcated ring, the nut registering with the screw to provide relative movement between the sleeve and the retainer.

* * * * *